(12) United States Patent  
Starke

(10) Patent No.: US 8,444,796 B2  
(45) Date of Patent: May 21, 2013

(54) MOLD FOR PRODUCING HOLLOW-CYLINDER-LIKE MOLDED PARTS

(75) Inventor: Matthias Starke, Kabelsketal (DE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/270,751

(22) Filed: Oct. 11, 2011

(65) Prior Publication Data

US 2012/0090772 A1   Apr. 19, 2012

(30) Foreign Application Priority Data

Oct. 15, 2010 (EP) .................................... 10187702

(51) Int. Cl.
*B28B 7/04* (2006.01)
*B28B 21/22* (2006.01)
*B29C 33/00* (2006.01)
*B29C 39/36* (2006.01)

(52) U.S. Cl.
CPC ..................................... *B29C 33/00* (2013.01)
USPC ...... 156/187; 156/244.13; 156/446; 425/184; 425/381; 425/393; 425/403; 425/414; 425/436 R; 425/467; 425/468; 425/470; 249/63; 249/126; 249/142; 249/145; 249/155; 249/180; 249/184

(58) Field of Classification Search
USPC ............. 249/58, 63, 126, 137, 138, 142, 144, 249/145, 155, 157, 159, 164, 176, 180–182, 249/184, 186; 425/180, 184, 188, 577, 380, 425/381, 391, 392, 393, 402–403, 414, 436 R, 425/438, 441, 436 RM, 465–468, 470; 264/171.29, 259, 267–269, 172.1, 171.12, 264/171.26; 164/137, 138, 341, 346, 364–367; 220/3.94, 528, 4.26, 8, 213, 218, 233, 234, 220/243, 252, 254.4, 254.5, 259.3, 820, 638; 156/187, 244.13, 169, 172, 175, 446
See application file for complete search history.

(56) References Cited

U.S. PATENT DOCUMENTS

| 265,540 A | * | 10/1882 | Robinson et al. | 215/398 |
| 481,952 A | * | 9/1892 | Ingram | 249/144 |
| 559,931 A | * | 5/1896 | Campbell | 249/157 |
| 1,055,502 A | * | 3/1913 | Zaiden | 249/55 |

(Continued)

FOREIGN PATENT DOCUMENTS

| DE | 3515986 A1 | * | 11/1986 |
| JP | 56126115 A | * | 10/1981 |
| JP | 05087115 A | * | 4/1993 |

*Primary Examiner* — Dimple Bodawala

(74) *Attorney, Agent, or Firm* — Buchanan Ingersoll & Rooney PC

(57) ABSTRACT

Exemplary embodiments are directed to a mold for producing hollow-cylinder-type molded parts, having an external mold portion, that determines an inner cavity of a molded part to be manufactured. The external mold portion has a first cylindrical mold, which extends in a rotationally symmetrical manner about a first axis, and a hemispherical mold having a diameter equal to a diameter of the first cylindrical mold directly adjoins one of the two ends of the cylindrical mold along the first axis, wherein a second cylindrical mold adjoins the hemispherical mold in radial alignment. The hemispherical mold has a spherical cap, the second cylindrical mold is rotatable together with the spherical cap about a second axis which is arranged at an angle with respect to the first axis, and the second cylindrical mold is arranged concentrically with respect to the second rotational axis.

10 Claims, 3 Drawing Sheets

U.S. PATENT DOCUMENTS

| | | | | |
|---|---|---|---|---|
| 1,099,010 A * | 6/1914 | Book et al. | | 249/146 |
| 1,103,039 A * | 7/1914 | Cudell | | 249/105 |
| 1,486,778 A * | 3/1924 | McWane | | 164/367 |
| 1,669,807 A * | 5/1928 | Buffat | | 249/108 |
| 2,250,729 A * | 7/1941 | Smith et al. | | 220/252 |
| 2,726,705 A * | 12/1955 | Marx et al. | | 156/392 |
| 3,082,820 A * | 3/1963 | Ednell | | 162/404 |
| 3,237,243 A * | 3/1966 | Saumsiegle et al. | | 425/384 |
| 3,559,581 A * | 2/1971 | Kriz et al. | | 102/467 |
| 3,672,261 A * | 6/1972 | Malek et al. | | 92/137 |
| 3,865,666 A * | 2/1975 | Shoney | | 156/245 |
| 4,059,384 A * | 11/1977 | Holland et al. | | 425/577 |
| 4,138,457 A * | 2/1979 | Rudd et al. | | 264/500 |
| 4,721,594 A * | 1/1988 | Jarvenkyla | | 264/508 |
| 4,749,530 A * | 6/1988 | Kunzler | | 264/2.7 |
| 4,757,857 A * | 7/1988 | Henkel | | 164/137 |
| 4,822,272 A * | 4/1989 | Yanase et al. | | 425/328 |
| 4,880,048 A * | 11/1989 | Gaulard | | 164/342 |
| 4,938,909 A * | 7/1990 | Daly | | 264/219 |
| 5,323,840 A * | 6/1994 | Usui et al. | | 164/332 |
| 5,804,123 A * | 9/1998 | Klomhaus et al. | | 264/318 |
| 6,216,493 B1 * | 4/2001 | Weston et al. | | 65/68 |
| 6,386,503 B1 * | 5/2002 | Schleicher | | 249/54 |
| 7,143,511 B2 * | 12/2006 | Connors et al. | | 29/890.032 |
| 7,980,290 B2 * | 7/2011 | Heinrich et al. | | 164/137 |
| 2006/0060289 A1 * | 3/2006 | Carter et al. | | 156/187 |

* cited by examiner

MOLD FOR PRODUCING HOLLOW-CYLINDER-LIKE MOLDED PARTS

RELATED APPLICATION

This application claims priority under 35 U.S.C. §119 to European Patent Application No. 10187702.5 filed in Europe on Oct. 15, 2010, the entire content of which is hereby incorporated by reference in its entirety.

FIELD

The disclosure relates to a mold, such as a mold for producing hollow-cylinder-type molded parts.

BACKGROUND INFORMATION

It is generally known that high-voltage transformers or else high-voltage inductors, for example having a rated voltage on the high-voltage side of, for example, 220 kV or 380 kV and a rated power of >100 MVA, are arranged in an oil-filled transformer tank for insulation and cooling purposes. In such a transformer the transformer bushing, introduces the high-voltage potential from the air side to the winding in the transformer tank. When pure air insulation is used, the distance between components at high-voltage potential and the earthed transformer tank should be up to 4 m or more, for example, depending on the voltage level. By means of oil-saturated paper or pulp, which can withstand very much higher field loading than air, the distance can be reduced considerably. If the high-voltage connection is led concentrically through a round opening into the tank, a distance between the inner conductor and the tank of, for example, 20 cm is sufficient.

It is furthermore known that domes can be used for this purpose in the region of the outgoing lines. Domes are rotationally symmetrical hollow bodies which can be made of a metal and have a hemispherical termination at one axial end with a mostly bent tube attachment for a conductor terminal and a tapering diameter at the other axial end. For improved insulation, these electrically conductive hollow bodies can be surrounded by a barrier, such as a double-walled barrier system which is made of an insulation material that is likewise arranged within the oil-filled transformer tank.

Such a barrier system, which can be matched to the basic shape of the metallic hollow body, is mostly produced from molded part modules which are made of a wet substance. This means that a layer of wet and therefore moldable pulp or some other insulation material is applied around a mold, the outer contour of which reproduces the inner cavity of the molded part to be produced, wherein the mold with the layer of insulating material surrounding it is then dried in a furnace and hardened.

It has proved to be disadvantageous in this respect, in particular, that the bent tube attachment is to be manufactured at a different angle to the rotational axis of the dome. Specifically, the angle of the tube attachment is determined by the conductor routing within the oil tank and depends predominantly on aspects of insulation. It is therefore possible that different angles of the tube attachment pieces of the three respective domes can be specified even in the case of a three-phase high-voltage transformer. In addition, high-voltage transformers are mostly unique or are manufactured at least only in minimal series, such that differences arise between the transformer types. It is disadvantageous that a transformer manufacturer therefore specifies a multiplicity of various molds for producing the insulation barriers.

In order to limit this variety of molds for the production of the insulation barriers, it is known to firstly produce a molded part without a tube attachment, to cut out a hole of the diameter of the tube attachment at the desired position in the hemispherical termination and secondly apply a tube attachment piece at the then individually stipulated angle, for example by adhesive bonding. This process uses additional working steps and reduces the ability of the molded part or molded part module used as the barrier to be insulated at the bonding point.

SUMMARY

An exemplary mold for producing hollow cylinder type molded parts is disclosed. The mold comprising an external mold portion, that determines an inner cavity of a molded part to be manufactured wherein the external mold portion has a first cylindrical mold, which extends in a rotationally symmetrical manner about a first axis, and a hemispherical mold having a diameter equal to the first cylindrical mold directly adjoins one of the two ends of the cylindrical mold, along the first axis second cylindrical mold adjoins the hemispherical mold in radial alignment, wherein the hemispherical mold has a spherical cap, wherein the second cylindrical mold is rotatable together with the spherical cap about a second axis, which is arranged at an angle with respect to the first axis, and wherein the second cylindrical mold is arranged concentrically with respect to the second rotational axis.

An exemplary process for producing molded parts using a mold having an external mold portion that determines an inner cavity of a molded part to be manufactured, wherein the external mold portion has a first cylindrical mold, which extends in a rotationally symmetrical manner about a first axis; a hemispherical mold having a diameter equal to the first cylindrical mold directly adjoins one of the two ends of the cylindrical mold along the first axis; second cylindrical mold adjoins the hemispherical mold in radial alignment, wherein the hemispherical mold has a spherical cap, wherein the second cylindrical mold is rotatable together with the spherical cap about a second axis, which is arranged at an angle with respect to the first axis, and wherein the second cylindrical mold is arranged concentrically with respect to the second rotational axis, and wherein the second cylindrical mold is connected to the spherical cap by means of a detachable connector. The process comprising rotating the spherical cap to a desired angle; locking the spherical cap; winding a soft and/or flexible material capable of hardening around the external mold portion of the mold; hardening the material to form the molded part; opening the detachable connection between the spherical cap and the second cylindrical mold; removing the first cylindrical mold with the axially adjoining hemispherical mold from the molded part, removing the second cylindrical mold from the molded part.

BRIEF DESCRIPTION OF THE DRAWINGS

The disclosure, further embodiments and further advantages are to be described in more detail with reference to the exemplary embodiments illustrated in the drawings.

DETAILED DESCRIPTION

Figure 1:
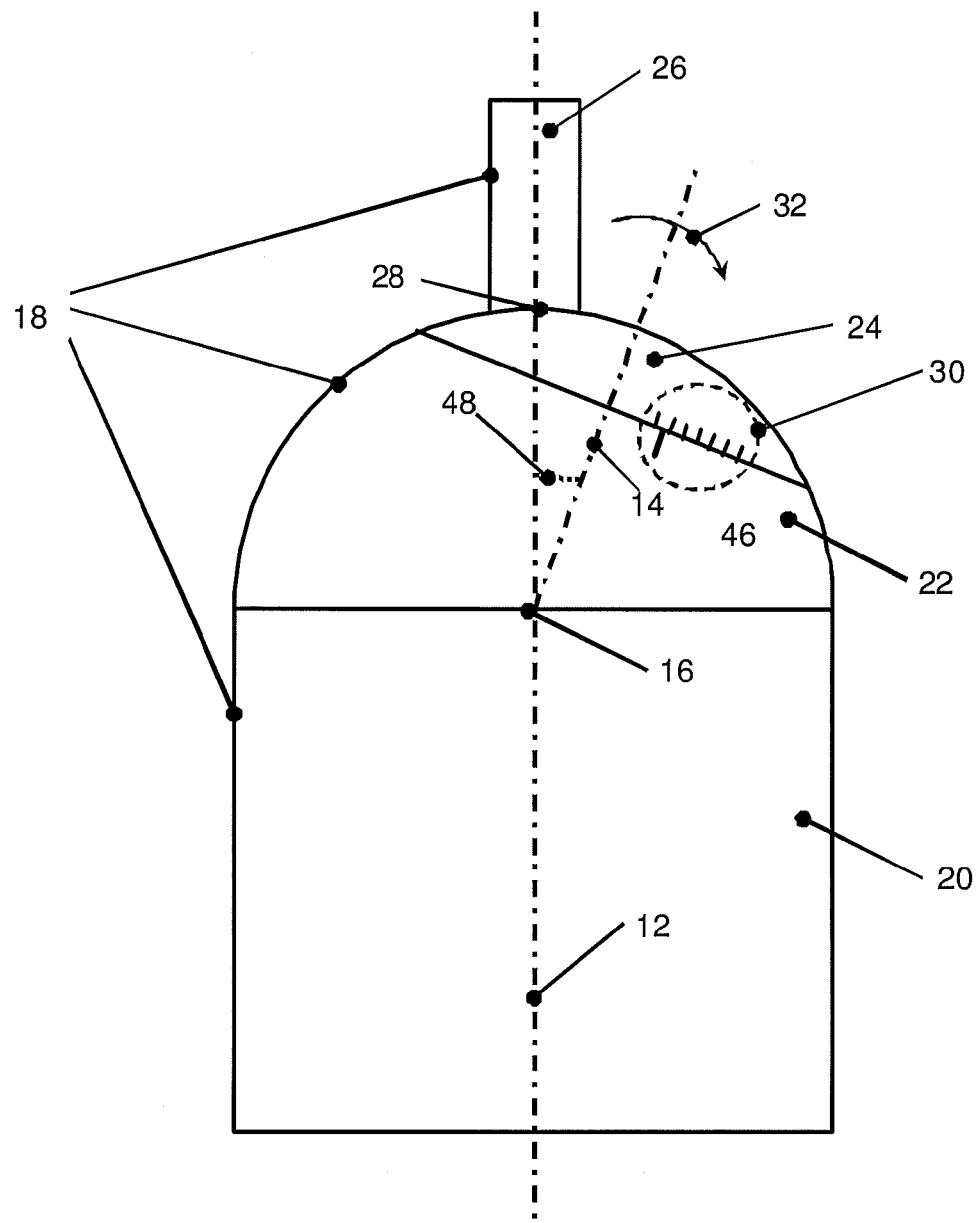
FIG. 1 shows an exemplary mold for producing molded parts in a first position, in accordance with an exemplary embodiment.

Exemplary embodiments of the present disclosure are directed to a hemispherical mold having a spherical cap. A second cylindrical mold is rotatable together with the spherical cap about a second axis which is arranged at an angle with respect to a first axis, and the second cylindrical mold is arranged concentrically with respect to the second rotational axis.

The basic concept of an exemplary mold of the disclosure which, in order to achieve a maximum dielectric strength, takes the tube attachment into account and additionally advantageously forms the tube attachment variably. The three basic elements of the mold according to the disclosure are therefore the first cylindrical mold, the axially adjoining hemispherical mold and the second cylindrical mold, which is radially aligned with respect to the hemispherical mold and ultimately determines the shape of the tube attachment. In order to form the tube attachment variably in terms of its angle with respect to the first axis of the mold, provision is made according to the disclosure of a spherical cap which is rotatable about a second axis, and which is at a respective angle to the first axis. The spherical cap is part of the hemispherical mold, i.e. the actual hemispherical mold remains unchanged despite the angle of rotation of the spherical cap.

The second cylindrical mold, which corresponds to the later tube attachment, is rotatable together with the spherical cap about the second axis with respect to the second axis. As a result rotation of the spherical cap therefore brings about a change in the angle at which the second cylindrical mold is aligned along the extent of the first axis, e.g. the rotational axis of the main part. Since the main part, e.g. the first cylindrical mold and the hemispherical mold, are rotationally symmetrical, a change in angle of the tube attachment about the first axis has no influence on the mold; Rather, a change in angle longitudinally with respect to the first axis influences the mold.

An insulation barrier, which surrounds a described, metallic dome body, is mostly formed in two parts, in which case two hollow cylindrical barrier modules are arranged around the dome body from both axial sides and are connected to one another. An above-described molded part with a tube attachment and an axial counterpart with a diameter tapering at one end, which has no tube attachment, are therefore to be connected to one another, e.g., to be inserted into one another. Since it has no tube attachment piece, the latter molded part module is easy to manufacture, even without a mold.

This exemplary arrangement advantageously provides a flexible mold for molded parts which can subsequently be used as an insulation barrier for a dome.

In an exemplary embodiment of the present disclosure, the surface of the spherical cap includes a region of intersection between the first axis and the surface of the hemispherical mold. This makes it possible for the second cylindrical mold to be arranged on the spherical cap such that it is rotatable together with the spherical cap so that alignment of the second cylindrical mold along the first axis is possible. It is therefore also possible to realize, for example, an angle of 0° between the alignment of the second cylinder or tube attachment piece and the first axis. An angle which goes beyond this is not specified owing to the rotational symmetry of the main body.

In another exemplary embodiment of the present disclosure, the second cylindrical mold is rotatable together with the spherical cap such that alignment of the second cylindrical mold at an angle of 30°, for example, with respect to the first axis is made possible. Together with the exemplary embodiment mentioned above, this arrangement therefore results in an angle range of 0° to 30°, for example, within which the second cylinder can be aligned in relation to the axial extent of the first axis. This advantageously covers the angle range which is possible in terms of insulation. The oblique position of the second axis with respect to the first axis for this specific example is then 15°, with the second cylinder then being arranged at an angle of likewise 15° concentrically with respect to the second axis on the spherical cap.

It proves to be particularly advantageous if the rotatable spherical cap is lockable. This avoids an undesirable change in the angle of alignment of the second cylindrical mold as the layer of insulation material is being applied around the mold. To further increase the accuracy of the angle of alignment, it additionally proves to be expedient if a protractor for determining the angle of rotation is provided, for example in the form of a marked scale which is engraved on the edge of the rotatable spherical cap and is to be placed in relation to a reference point engraved on the adjoining region of the hemispherical mold. As the angle indication, it is conceivable to specify both an absolute angle indication of the angle of rotation of the spherical cap, i.e. between, for example, 0° and 360°, or else the resulting setting angle of the second cylindrical mold, for example 0° to 30°.

In yet another exemplary embodiment of the present disclosure, the second cylindrical mold can be connected to the spherical cap by means of a detachable connection. This connection makes it possible, if the second cylindrical mold is at a setting angle different to 0° with respect to the first axis, to remove the mold from the then produced molded part after the insulation material has hardened, which would otherwise not be possible by way of an angled tube attachment. Once the second cylindrical mold has been detached, the main part of the mold, specifically the first cylindrical mold and the hemispherical mold with the spherical cap, can be removed from the molded part, and following this step the second cylindrical mold can be removed from the tube attachment of the molded part. In an exemplary embodiment, the detachable connection to be a screwed connection, which, for example, is accessible from that side of the second cylindrical mold which is remote from the hemispherical mold.

It can be advantageous if at least one mold element, i.e. the first cylindrical mold, the hemispherical mold, the spherical cap and/or the second cylindrical mold, has at least one internal cavity. This cavity reduces the weight of the mold and simplifies the manufacture thereof. In an exemplary embodiment of the present disclosure the mold can be manufactured predominantly from aluminium, which proves to be suitable both on account of its low density, because the mold as a whole is thereby lighter and thus easier to handle, and on account of its resistance to the insulation material applied.

An exemplary process according to the present disclosure for producing molded parts using an exemplary mold of the disclosure includes the following process steps:
  a) the spherical cap is rotated to a desired angle,
  b) the spherical cap is locked,
  c) a soft and/or flexible material capable of hardening is layered or wound around the external mold portion of the mold,
  d) the material is hardened to form the molded part,
  e) the detachable connection between the spherical cap and the second cylindrical mold is opened,
  f) the first cylindrical mold with the axially adjoining hemispherical mold is removed from the molded part, and g) the second cylindrical mold is removed from the molded part.

FIG. 1 shows an exemplary mold for producing molded parts in a first position in accordance with an exemplary embodiment. The main part of the mold 10 includes a first cylindrical mold 20 and a hemispherical mold 22, which are arranged in a rotationally symmetrical manner about a first axis 12 with their outer surface. The hemispherical mold 22 additionally can include a spherical cap 24 which is rotatable about a second axis 14 in the direction indicated by the arrow 32, the second axis 14 being arranged at an angle with respect to the first axis 12, as indicated by reference numeral 48. The angle of rotation of the spherical cap 24 about the second axis 14 can be determined using a protractor, which is denoted by reference numeral 30 and substantially includes, for example, marked engravings in the surface of the spherical cap 24 and the adjoining remainder of the hemispherical mold 22.

Connected detachably to the rotatable spherical cap 24 is a second cylindrical mold 26, by way of which the shape and alignment of a tube attachment of a molded part to be manufactured is ultimately determined. The second cylindrical mold 26 can be arranged in radial alignment with the center of the hemispherical mold on the surface thereof. For geometric reasons, both the axis of the radial alignment of the second cylindrical mold 26 and the first axis 12 and the second axis 14 necessarily meet at a common point of intersection 16 irrespective of the angle of rotation of the spherical cap. The second cylindrical mold 26 can be arranged on the spherical cap at an angle concentrically with respect to the second axis 14 which corresponds precisely to the angle of inclination 48 of the second axis 14. It is therefore possible, as indicated in the figure, to rotate the second cylindrical mold 26 together with the spherical cap 24 to such an angled position that the radial alignment of the second cylindrical mold 26 runs together with the first axis 12.

During the manufacture of a corresponding molded part, a soft or flexible insulation material, for example a moist pressed chip product, is layered around an external mold portion 18 of the mold. In this example, the external mold portion is composed of the outer surfaces of the respective mold components, the base surface of the first mold cylinder 20, in particular, not forming part of the external mold portion 18. In this context, it should be noted that the cylindrical mold 20 and the hemispherical mold 22 can of course both be formed from a common part and be joined together from a plurality of parts. For manufacturing reasons, the use of a tubular hollow cylinder is suitable, for example, for the first mold cylinder. The spherical cap 24 does not necessarily have to be a spherical portion in a mathematical sense; instead, it is appropriate to implement the mold as a cylinder or cone around the second axis 14 in the invisible inner region, in order to thereby make simple, rotatable mounting possible in relation to the rest of the hemispherical mold 22, which then has a corresponding cylindrical or conical countershape.

The second cylindrical mold 26, also has a tubular form. Apart from a saving in weight and material, this form allows for better access, for example to a fastening apparatus (not shown) between the spherical cap 24 and the second cylindrical mold 26, for example a screw. This can then be easily tightened or loosened, as specified, by a screwdriver or Allen key or the like guided through the second cylindrical mold 26.

The second cylindrical mold 26 can be detached when an insulation material has been layered around the external mold portion 18 and the molded part produced therefrom by baking is to be separated from the mold. FIG. 1, however, shows an exemplary embodiment in which this arrangement is not specified because the alignment of the second mold cylinder runs straight with the first axis 12, such that a molded part can be separated from the mold as a whole by a pulling movement in the direction of the first axis 12.

Figure 2:
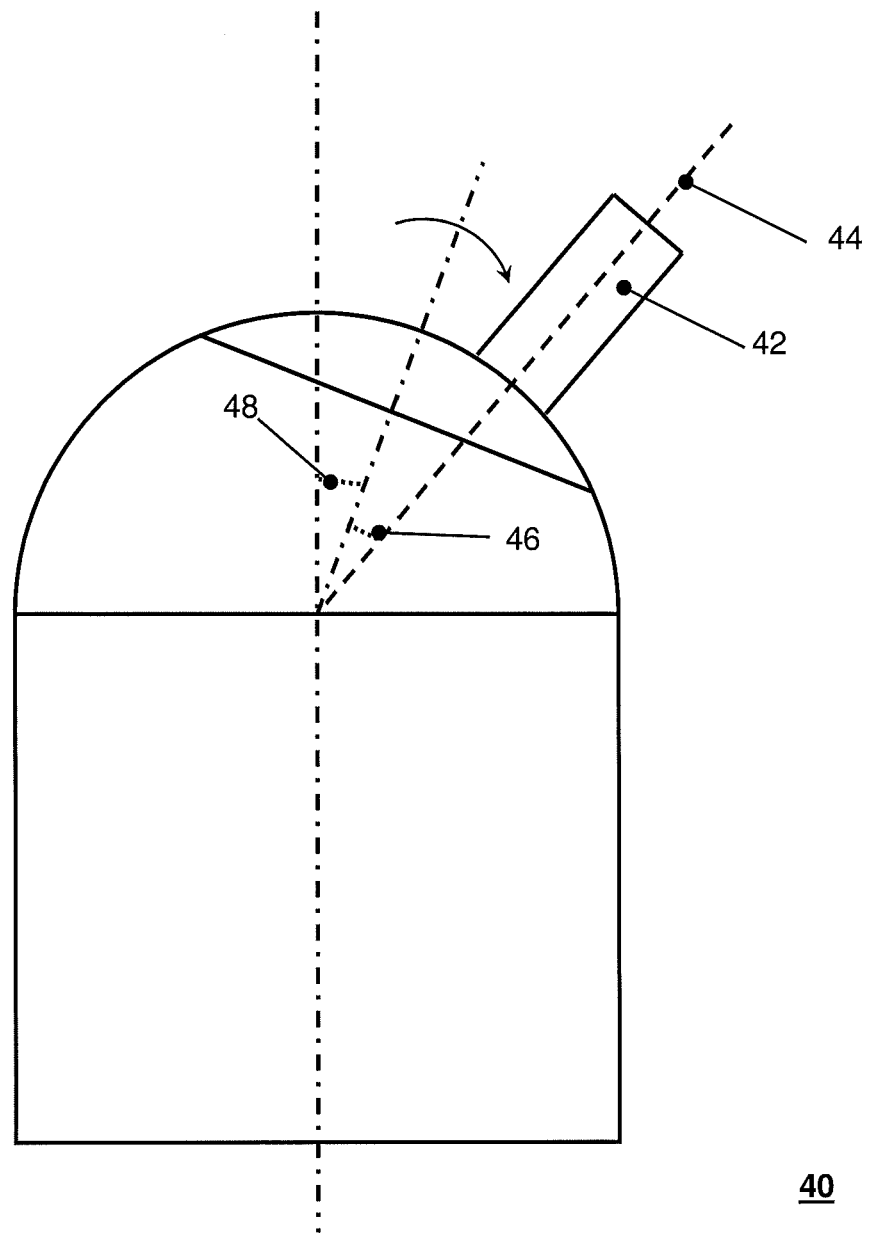
FIG. 2 shows an exemplary mold for producing molded parts in a second position in accordance with an exemplary embodiment.

FIG. 2 shows an exemplary mold for producing molded parts in a second position in accordance with an exemplary embodiment. As shown in FIG. 2, the alignment axis 44, which runs radially with respect to the center 16 of the hemispherical mold, of the second cylindrical mold is not congruent with the first axis 12 in the second rotational position 42, but can be instead arranged at an opposite extreme. The sum of the angle of inclination 48 of the second axis 14 and the concentric angle 46 therefore establishes the overall angle.

Depending on the rotational position of the spherical cap 24, the alignment axis 44 of the second cylindrical mold 26 therefore fluctuates between, for example, 0° and twice the angle of inclination 48 of the second axis 14, since in this case the sum of the concentric angle 46 is equal to the angle of inclination 48.

Figure 3:
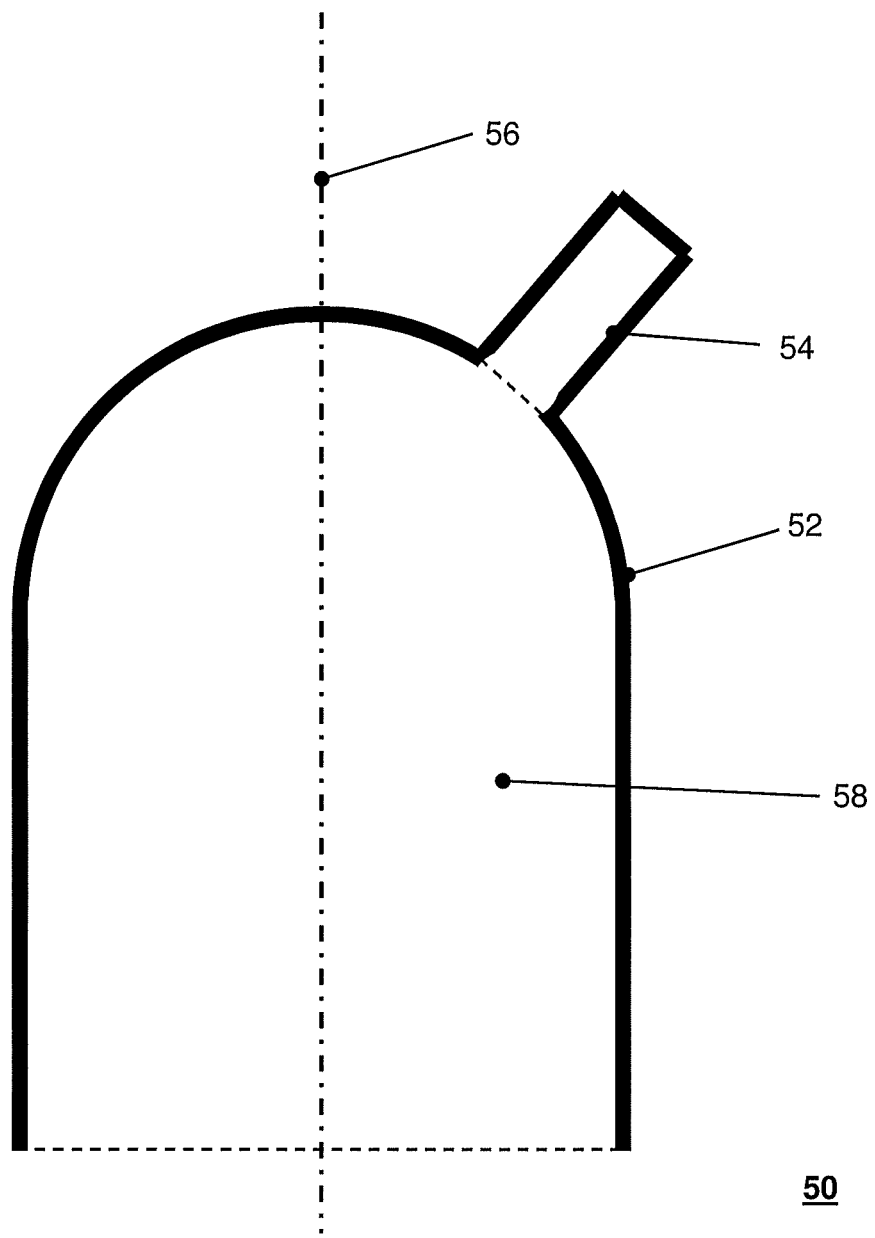
FIG. 3 shows an exemplary molded part in a sectional view in accordance with an exemplary embodiment.

In particular, FIG. 3 shows an exemplary molded part in a sectional view in accordance with an exemplary embodiment. FIG. 3 shows an exemplary molded part in a sectional view, as would be produced by using a mold shown in FIG. 2 in the position shown therein. The insulation material applied around an external mold portion is hardened and the mold has been removed. This arrangement results in a main body 52 of a molded part which is symmetrical about a first axis 56, with an inner cavity 58 from which a hollow cylindrical tube attachment 54 proceeds in the upper region.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Numerals

10 Exemplary mold for producing molded parts in a first position
12 First axis
14 Second axis
16 Point of intersection between the first axis, the second axis and the radial alignment
18 External mold portion
20 First cylindrical mold
22 Hemispherical mold
24 Spherical cap
26 Second cylindrical mold in a first rotational position
28 Point of intersection between the surface of the hemispherical mold and the first axis
30 Protractor for determining the angle of rotation of the spherical cap
32 Direction of rotation of the spherical cap
40 Exemplary mold for producing molded parts in a second position
42 Second cylindrical mold in a second rotational position
44 Radial alignment of the second cylindrical mold
46 Eccentric angle
48 Angle between the first and second axes
50 Exemplary molded part in a sectional view
52 Main body of the molded part
54 Hollow cylindrical tube attachment
56 First axis
58 Inner cavity

What is claimed is:

1. A mold for producing hollow-cylinder-type molded parts, comprising:
    an external mold portion is configured to determine an inner cavity of a molded part to be manufactured, wherein the external mold portion has a first cylindrical mold, which extends in a rotationally symmetrical manner about a first axis;
    a hemispherical mold having a diameter equal to the first cylindrical mold directly adjoins one of the two ends of the first cylindrical mold along the first axis, wherein the hemispherical mold has a spherical cap; and
    a second cylindrical mold is connected to the spherical cap of the hemispherical mold by means of a detachable connector in radial alignment such that the second cylindrical mold is rotatable together with the spherical cap about a second axis, which is arranged at an angle with respect to the first axis, and
    wherein the second cylindrical mold is arranged concentrically with respect to the second rotational axis.

2. The mold according to claim 1, wherein the surface of the spherical cap includes a region of intersection between the first axis and a surface of the hemispherical mold.

3. The mold according to claim 2, wherein the second cylindrical mold is rotatable together with the spherical cap to establish alignment of the second cylindrical mold along the first axis.

4. The mold according to claim 2, wherein the second cylindrical to establish mold is rotatable together with the spherical cap alignment of the second cylindrical mold at an angle of 30° with respect to the first axis.

5. The mold according to claim 1, wherein the rotatable spherical cap is lockable.

6. The mold according to claim 1, including a protractor for determining an angle of rotation of the spherical cap.

7. The mold according to claim 1, wherein the means of detachable connector is a screwed connector.

8. The mold according to claim 1, wherein at least one mold element has at least one internal cavity.

9. The mold according to claim 1, wherein said mold is formed of aluminium.

10. A process for producing hollow-cylinder-type molded parts using a mold having an external mold portion is configured to determine an inner cavity of a molded part to be manufactured, wherein the external mold portion a first cylindrical mold, which extends in a rotationally symmetrical manner about a first axis;
    a hemispherical mold having a diameter equal to the first cylindrical mold directly adjoins one of the two ends of the first cylindrical mold along the first axis, wherein the hemispherical mold has a spherical cap; and
    a second cylindrical mold is detachably connected to the spherical cap of the hemispherical mold in radial alignment such that the second cylindrical mold is rotatable together with the spherical cap about a second axis, which is arranged at an angle with respect to the first axis, and
    wherein the second cylindrical mold is arranged concentrically with respect to the second rotational axis, wherein the process comprising:
    rotating the spherical cap to a desired angle; locking the spherical cap;
    winding at least one of a soft and flexible material capable of hardening around the external mold portion of the mold;
    hardening the material to form the molded part;
    opening a detachable connection between the spherical cap and the second cylindrical mold;
    removing the first cylindrical mold with the axially adjoining hemispherical mold from the molded part; and
    removing the second cylindrical mold from the molded part.

* * * * *